June 22, 1965 R. C. NOBLE ETAL 3,191,037
APPARATUS FOR WIPE TESTING RADIOACTIVE SOURCES
Filed Feb. 4, 1963
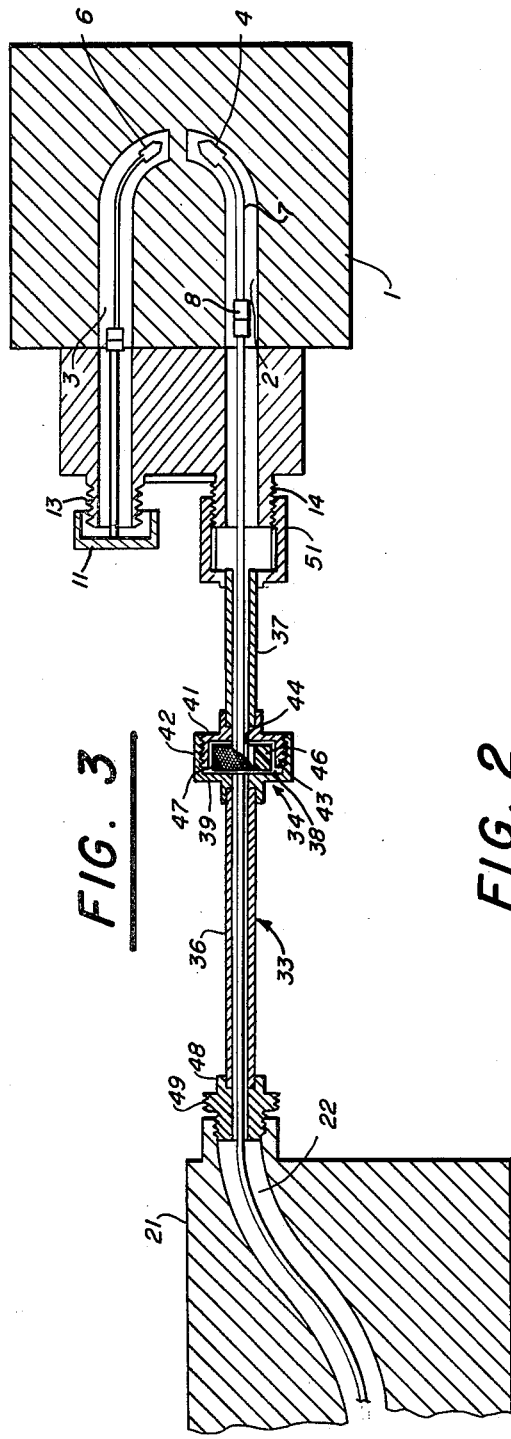
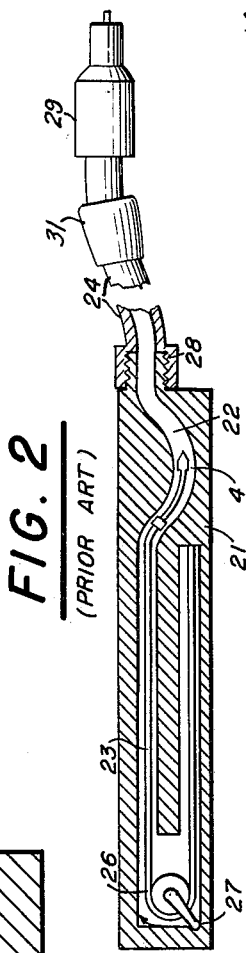
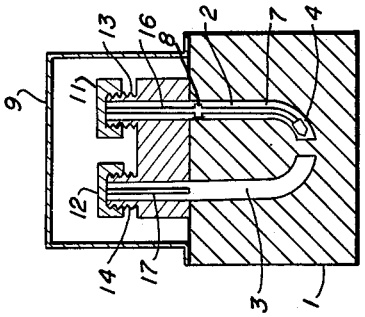
FIG. 1 (PRIOR ART)
FIG. 2 (PRIOR ART)
FIG. 3
FIG. 4
INVENTORS
ROBERT C. NOBLE
LELAND E. BROYLES
CHARLES R. SANDEEN
BY
ATTORNEYS

# United States Patent Office 3,191,037
Patented June 22, 1965

3,191,037
APPARATUS FOR WIPE TESTING RADIO-ACTIVE SOURCES
Robert C. Noble, 536 S. Minahen, and Leland E. Broyles, 3529 Beckworth Drive, both of Napa, Calif.; and Charles R. Sandeen, 324 Sacramento St., Vallejo, Calif.
Filed Feb. 4, 1963, Ser. No. 256,177
3 Claims. (Cl. 250—106)

The invention described herein may be manufactured and used by or for the Government of the United States of America for governmental purposes without the payment of any royalties thereon or therefor.

In industrial radiography and other similar work, it is common practice to employ radioactive isotopes, such as cesium 137, cobalt 60, iridium 192, thulium 170, etc., which are produced under the close control of the Atomic Engery Commission and shipped, as needed, to licensed users. The isotopes themselves are provided to users in the form of stainless steel capsules that contain the active material and, in their shipment, it, of course, is necessary to employ heavy lead containers capable of absorbing the radiation sufficiently to prevent personal injuries.

Upon receipt by the users, the capsule is transferred to a suitable projector which may assume a variety of forms but which usually consists of: a shield or "head" within which the source is stored when not in use; a mount that allows the head to be aimed in any direction when used as a beam-producer; and, of considerable present significance, a control cable and a source tube which are used to expose the source beyond the collimating cone of the head.

The significance of the cable and tube will be explained subsequently.

Functionally, insofar as the radiographic work is concerned, the control cable usually is secured fastened to the radiographic source itself and the cable is used either to position the source in the head when a collimated beam is to be produced, or to move the source through the long source tube if it is desired to utilize the source at a distance from the head itself. Usually the source tube is a flexible member which has one end detachably coupled to the head and its other end adapted to be coupled to external objects, such as the shipping container.

An obvious problem in any isotope work lies in the handling of the active material so as to minimize injuries. In the present use this problem is somewhat aggravated by the distinct possibility of leakage of the active material through the capsule wall. Some isotopes, such as cesium 137, which is formed of a compacted powder, are more likely to leak than others, although all pose a sufficient threat to require frequent periodic inspections during use as well as initial and final inspections at the times of receipt and return of the capsules in their shipping containers. Such inspections have proven costly, time-consuming and frequently inconclusive because of the methods employed. Common inspection techniques rely upon a wipe test which may be performed in different manners as long as explicitly specified requirements are satisfied. One technique, for example, is to employ a pair of relatively long manipulating rods or arms, one of which is used to grasp the source capsule while the other wipes it with a piece of gauze which, after the wipe, is dropped into a test tube and analyzed. Other techniques attempt to achieve greater control of the capsule as well as a more thorough wipe, but, as far as has been ascertained, none of these techniques have effectively overcome these difficulties or materially minimized the time factor. For example, the previous techniques make little provision for controlling wiping pressure or obtaining a true 360° wipe. In particular, control of the source during the wipe has proven inadequate with resulting substantial loss of time as well as increase in hazards.

It is therefore an object of the invention to provide apparatus for leak testing radioactive sources of the type described, the apparatus itself permitting complete control of the source during the testing, as well as assuring thoroughly reliable test results.

Another object is to provide such a test apparatus which is easily adapted for use with a variety of radiographic projector heads and shipping containers.

A further object is to provide a wipe test apparatus and technique by means of which the source is given a complete 360° wipe and the wipe pressure is variable to suit different needs.

Other objects are to provide such an apparatus to materially increase the safety factor of the test operation as well as reduce the required time and minimize the individual skills necessary for effective performance.

For a complete unerstanding of the invention, it is necessary to clearly visualize certain prior art components with which the present apparatus is intended for use. For this reason, the invention is partly illustrated by prior art figures.

In the drawings, FIG. 1 is a prior art schematic illustration showing one form of a shipping container used to transport and store a radioactive source; FIG. 2 is another prior art schematic showing a projector head, control cable and source tube of a type conventionally used in radiographic work; FIG. 3 illustrates a preferred embodiment of the wipe test apparatus of the invention operatively coupled between a conventional projector and a shipping container, and FIG. 4 is a plug component of the apparatus.

Referring to the drawings, the shipping container of FIG. 1 is a shielded storage unit formed principally of a solid lead body 1 having a pair of curved channels 2 and 3 extending downwardly into it from its top surface, these channels forming vaults for protectively receiving both new radioactive sources as well as used ones. As shown in FIG. 1, a new source 4 normally is carried in right-hand channel 2. FIGS. 2 and 3 illustrate the fact that left-hand channel 3 is used for storing used sources 6 particularly when these sources are being returned to the supplier. The curve of the channels is specially designed as a safety feature so that operators working over the channel opening are not in the direct path of the radiation.

Each radioactive source is sealed in a stainless steel capsule which, in turn, may be swaged onto the end of a short length of stainless steel cable 7, and a spring-lock fitting, or the like, 8 is used to fasten the source assembly to a control cable. This connection may be a ball and socket type which is as secure as possible so as to be separated only by a special wrench. A source material or pellet such as cobalt 60 or other gamma radiators, is sealed within the capsule and, of course, precautions are taken to insure against leakage or against other contamination of the capsule exterior during the production process.

Body 1 of the container has a bolted protective cover 9 and the assembly further includes internally-threaded caps 11 and 12, one for each of the channels. These caps thread onto externally-threaded nipples 13 and 14 and they bear against rods 16 and 17 used to assure that the radioactive pellets are securely held "around the bend" of the channels.

Upon receipt of the shipping container by the licensed user, the new pellet is transferred in a manner to be considered to a conventional projector assembly illustrated in FIG. 2. As there seen, the assembly includes a projector head 21 shown schematically as having an interior channel 22 in which a source pellet 4 is protectively stored when not being used for radiographic exposures. Customarily, projector assemblies are designed either to permit collimated beam formations with the source pellet contained and focused by the projector head proper, or to permit the source to be advanced out of the head proper to a remote location where it can be employed in a completely exposed position so as to provide a panoramic or a circumferential exposure.

For these purposes, the projectors include a control cable 23 and a source tube 24. As to cable 23, it will be noted in FIG. 2 that this unit is securely attached to source 4 and that the cable is driven by a gear 26 having a crank 27 by means of which the source can be extended or retracted. The control cable usually is formed of steel wound with a heavy wire which engages with cogs on gear 26 to create an efficient worm drive. Of course, as should be apparent, the cable as well as the other projector and shipping container components may assume varied forms so long as the test apparatus yet to be described can be employed in conjunction with them.

Source tube 24 is used to position the source remotely from the projector head proper. As seen, one end of this tube has a threaded male fitting 28 received in a matching female fitting of the head, while the other end is coupled to a shielded nozzle 29 by being formed with a female threaded fitting 31. When crank 27 of the control cable is rotated the source pellet is driven through the source tube into nozzle 29 where it is exposed for the radiographic work to be done.

It also is to be noted that control cable 23 and source tube 24 are used in initially transferring the source pellet from the shipping container into the projector head proper. This operation is accomplished by driving the control cable through the source tube, connecting it to the pellet, and also connecting female fitting 31 of the source tube to threaded nipple 13 of the container. The control cable then can be retracted to position the pellet in the projector head. Obviously, used pellets to be returned to the supplier also can be transferred to the shipping container by means of the control cable and the source tube, the tube in this instance being coupled to nipple 14 of the container.

The present invention is illustrated in FIG. 3 in which like numerals represent elements already described with reference to FIGS. 1 and 2. Considered generally, it will be seen that the invention is a wipe test tool designated in its entirety by numeral 33, the tool being substituted between shipping container 1 and projector head 21 in lieu of source tube 24. The purpose of the tool is to effect a thorough and controlled wiping of source pellets 4 or 6 by utilizing the drive control cable to reciprocate the pellet through a special doughnut or gauge-covered ring 34. The wiping, of course, is to ascertain any contamination on the pellet casing due to leaking or deposition of active material.

In greater detail, it is seen that the tool is formed of a pair of axially-aligned brass or aluminum tubular sections 36 and 37 centrally coupled to each other in such a manner as to form a chamber 38 within which doughnut 34 is positioned. To provide the chamber, each central end section 36 and 37 is annularly enlarged by means of radial flanges 39, 41 and lateral flanges 42, 43, these flanges being formed on special fittings that are soldered to the respective tubular sections. As seen, flange 39 is greater than flange 41 and each is threaded so that the rings formed by these flanges threadably fit together in a telescopic engagement. Also, flange 42 preferably is knurled to facilitate engagement and disengagement.

Doughnut 34 is sized to closely fit within the chamber and, of course, the doughnut has a central bore 44 sized to frictionally receive the source pellet as it is reciprocated through it. Preferably, the doughnut is formed of a plastic ring 46 about which is tightly wrapped a layer of gauze material 47.

To couple the test tool to the projector head, the outside end of its tubular section 36 is formed with a threaded male fitting 48 having a knurled portion 49, and, as will be seen, this fitting is fitted and soldered to the tube section. The same is true of tubular section 37 except that it is provided with an interiorly threaded female fitting 51.

To perform a wipe test, the tool, as has been stated, is secured in the obvious manner to projector head 21 in lieu of the source tube. If it is desired to test a new radioactive source carried by a shipping container, the operation is initiated by turning the container on its side (FIG. 3) and then removing its cover 9, cap 13 and holddown rod 16. Crank 27 of the control cable then is turned to advance the empty cable end through the tool bore until it projects outwardly of female fitting 51; it then being possible to connect the control cable to source 4. In the illustrated embodiment this connection is made by physically securing the control cable to a connector member carried by short cable length 7 of the source. Obviously, other containers will vary somewhat from that shown in the drawings, and, in addition, the sources will be formed and positioned in different manners. However, the present tool is easily adapted for such modifications particularly since it is conventional practice to use the source tube to transfer the source so that the tool simply takes a form which permits its use in lieu of the source tube.

With the control cable coupled in the stated manner, control cable crank 27 again is rotated to draw the source out of the container and through the gauze doughnut. Also, it is of considerable significance to note that the frictional engagement of the doughnut's bore can be varied by means of the threadably telescoped connection forming chamber 38. In other words, the size of this chamber can be reduced to compress the doughnut and reduce its bore diameter.

After a wipe has been made, the source again is positioned by means of the control cable crank in its container channel 2. The tool then is separated to remove the gauze of the doughnut which is subjected to suitable test for determining the presence and extent of contamination. According to general practices, the test is made by wadding the gauze into a test tube that, in turn, is placed in a sodium iodide well crystal. If no contamination is found, the control cable then can be used to transfer the source into the projector head.

In some instances the source wipe will show just below the maximum allowable degree of contamination. If so, the present tool can be employed to determine whether the contamination is due to a leak or possibly to deposit of active material on the source capsule during manufacture. This operation is accomplished by telescoping chamber 38 to squeeze the doughnut and obtain maximum wiping pressure on the source. Usually, several wipes then are made at 24 hour intervals and, if contamination persists, the cause obviously is due to a leak. However, if the cause is surface deposit during manufacture, the maximum pressure applied to the source completely decontaminates it by wiping it clean, and, in this event, it then is possible to safely use this particular source.

In another frequently arising situation, it is desired to wipe test the source after it has been transferred to the projector head and subjected to a period of use. In this instance, the shipping container is not involved. In its stead, an aluminum plug of the type shown in FIG. 4 is employed to stop the end of tubular section 37. With the plug attached, the tool is secured to the projector head in the manner already described and the control cable crank then rotated to move the source out of the head and through the doughnut bore. Testing of the gauze is accomplished in the described manner and, again, it is possible to control the frictional pressure of the doughnut. Obviously, this pressure can be controlled not only to distinguish leakage from exterior contamination, but also to accommodate sources of varying diameters. In fact, an important advantage of the present tool is its versatility or adaptability to sources of varying diameters as well as differing types of projectors and shipping containers.

Other advantages which now should be more or less obvious include the complete, positive control of the radioactive sources at all times, while, at the same time, acquiring a wipe which eliminates the accidental spread of contamination or over-exposure of personnel. Another distinct feature is the 360° wipe of the source. In this regard, prior wipes relay on the skill of the operator to cover the entire 360° surface area of the source and, because of the real hazards involved, any error in this regard is a matter of grave concern. As already has been emphasized, the control of the wiping pressure has real advantages both in adaptability and in permitting decontamination. Finally, a consistent time factor can be depended upon and no time should be sacrificed due to loss of control of the source.

Obviously many modifications and variations of the present invention are possible in the light of the above teachings. It is therefore to be understood that within the scope of the appended claims the invention may be practiced otherwise than as specifically described.

What is claimed is:

1. For use with a radiographic apparatus including a radioactive source beam projector head having a tubular passage, a projector control cable for engaging and moving said source through said passage and out of said head, a radioactive source shipping container having an internal tubular passage for receiving said source, and a source tube adapted to be detachably coupled at one end to said head and at the other end to said container; test apparatus for leak testing said radioactive source, said apparatus comprising:

a pair of axially-aligned tubular sections, the first member of said pair having a free end formed to be detachably coupled to said head in communication with its tubular passage in lieu of said source tube, and its other end annularly enlarged for forming a ring of increased internal diameter, the second member of said pair also having a free end formed to be detachably coupled to said shipping container in communication with its tubular passage in lieu of said source tube, and its other end annularly enlarged for forming a second ring of increased diameter, said first and second rings being telescopically and threadably interconnected for forming a chamber, and a compressible doughnut-shaped wipe test member closely fitted with said chamber with its bore axially aligned with said tube bores, said doughnut-shaped member including a ring formed of a compressible plastic material, and a gauze wrapping continuously covering the bore surfaces of said ring, whereby said radioactive source can be engaged by said control cable and moved through said doughnut member in frictional contact with its bore surfaces for wiping contamination from the source, said threadable interconnection of said first and second rings permitting said doughnut member to be compressed for varying the diameter of its bore and consequently its frictional engagement with said sources.

2. The test apparatus of claim 1 wherein said free end of said first tubular section is formed with an externally-threaded male fitting, and the free end of said second tubular section is formed with an interiorly-threaded female fitting.

3. The test apparatus of claim 2 further including a metal plug threadably engaging said female fitting for closing said free end of said second tubular section.

References Cited by the Examiner

UNITED STATES PATENTS

| | | | |
|---|---|---|---|
| 2,598,215 | 5/52 | Barkowski | 313—93 X |
| 2,866,217 | 12/58 | Dean | 15—210 |
| 2,976,423 | 3/61 | Prest | 250—106 |

RALPH G. NILSON, *Primary Examiner.*

JAMES W. LAWRENCE, *Examiner.*